United States Patent

Teague

[15] 3,673,293
[45] June 27, 1972

[54] MANUFACTURE OF PLASTER OF PARIS MOLD HAVING SPRAYED METAL OXIDE LININGS AND PRODUCT

[72] Inventor: Ernest Douglas Teague, Welwyn Garden City, England

[73] Assignee: Norton Abrasives Limited, Welwyn Garden City, England

[22] Filed: Feb. 17, 1970

[21] Appl. No.: 12,120

Related U.S. Application Data

[63] Continuation-in-part of Ser. No. 633,129, April 24, 1967, abandoned.

[30] Foreign Application Priority Data

April 29, 1966 Great Britain ................... 18,986/66

[52] U.S. Cl. .................. 264/60, 249/114, 264/86, 264/87, 264/220, 264/225, 264/226, 264/338
[51] Int. Cl. ................ C04b 39/08, B32b 13/04, B28b 7/36
[58] Field of Search ............... 264/56, 60, 62, 86, 87, 220, 264/225, 226, 338; 249/114

[56] References Cited

UNITED STATES PATENTS

| | | | |
|---|---|---|---|
| 3,389,001 | 6/1968 | Blackburn et al. | 264/56 |
| 2,990,601 | 7/1961 | Wagner | 264/80 |
| 3,228,650 | 1/1966 | Gilliland et al. | 264/225 |
| 3,405,212 | 10/1968 | Fraser et al. | 264/226 |
| 3,536,800 | 10/1970 | Hubbard | 264/338 |
| 2,984,887 | 5/1961 | Thiess | 264/338 |
| 2,879,196 | 3/1959 | Brucker | 264/317 |

FOREIGN PATENTS OR APPLICATIONS

| | | | |
|---|---|---|---|
| 1,243,882 | 9/1960 | France | 264/86 |

OTHER PUBLICATIONS

J. Oliver et al., "Metal Spraying of Mouldmakers' Cases," December, 1965, Ceramics at 20–22 and 24.
J. A. Carter, "Permeable Mold Materials," March, 1966, Ceramic Bulletin at 263–265

*Primary Examiner*—Philip E. Anderson
*Assistant Examiner*—John H. Miller
*Attorney*—Stevens, Davis, Miller & Mosher

[57] ABSTRACT

A metal or ceramic form of desired shape and conditioned to permit its later removal from a flame sprayed layer is flame sprayed to form a metal oxide layer of desired thickness having a porosity of 10 percent or more. A plaster of paris slurry is then poured around this layer and allowed to set up at which time the form is removed leaving a plaster of paris mold with a flame sprayed metal oxide wear resistant working lining suitable for use in slip casting, etc.

9 Claims, 2 Drawing Figures

MANUFACTURE OF PLASTER OF PARIS MOLD HAVING SPRAYED METAL OXIDE LININGS AND PRODUCT

This application is a continuation-in-part of my copending application Ser. No. 633,129, filed Apr. 24, 1967 and now abandoned.

BACKGROUND AND SUMMARY OF THE INVENTION

This invention relates to molds for casting and to a method of forming a mold with a refractory and erosion resistant coating.

According to the present invention there is provided a method of forming a mold body with a refractory coating comprising flame spraying a refractory coating on a former, forming the body of the mold on the side of the coating opposite to the former and removing the former from the coating. The body of the mold may be of plaster of Paris or may be a cast refractory material.

A method of flame spraying for use in the method according to the present invention is exemplified by U.S. Pat. No. 2,707,691, to Wheildon, Jr., which discloses suitable flame spraying techniques. Among other methods which should be mentioned as being suitable for laying down the refractory coating via flame spraying, the art of oxyacetylene or plasma gun spraying is specifically included within the meaning of flame spraying of the present invention. According to the method of plasma gun or electric arc spraying, a metal oxide is used in powder form, the metal oxide particles being rendered molten in the arc and subsequently conveyed onto a surface to be coated by a stream of hot gas.

To aid in the removal of the former from the coating, the surface of the former is preferably blasted with very fine abrasive before application of the refractory coating; this surface of the former may also be coated with a release material before the coating is applied.

The free surface of the coating supported on the former is usually rough, so that the mold body built up on this rough surface adheres strongly to the coating and prevents removal of the coating with the former when the composite coating and body structure is removed from the former.

When the refractory coating has a porosity of about 10 percent, the composite mold with the refractory coating and adherent body may be used for the casting of pottery ware. The provision of such a refractory coating of the desired porosity of about 10 percent is provided by the use of a flame sprayed metal oxide such as a refractory coating of fused alumina. In addition to alumina, other metal oxides which provide a refractory coating with a porosity of about 10 percent are also contemplated within the scope of the present invention. As further examples of suitable metal oxides there may be mentioned zirconium oxide and other oxides listed in U. S. Pat. No. 2,707,691 which provides a porosity of about 10 percent.

Molds which have been made from plaster of Paris are known in the prior art, and have many advantages, including the accurate reproduction of the surface of a master form by casting a fluid plaster of Paris mixture. The ease of machining of the reverse side of the dried mold to any shape required also renders plaster of Paris molds highly desirable. The high degree of porosity and capillacity of the dried mold is particularly advantageous, as it readily absorbs water from plastic clay being formed in the mold and permits vacuum or negative pressure to be applied to the reverse side of the mold to facilitate withdrawal of water, particularly when high production rates are required.

Plaster of Paris molds have, however, relatively little resistance to abrasion, erosion or scratching, particularly when wet. Damaged molds can result in defective pottery ware which are expensive to rectify in the pottery moldings or by replacement of the mold form.

The problem of resistance to abrasion, erosion and scratching seriously detracts from the value of making molds of plaster of Paris. Furthermore, the prior art has not provided plaster of Paris molds which are coated with a metallic coating resistant to abrasion, because to make such a coating would negate the reason for using plaster of Paris for the mold, i.e., the water withdrawing property of plaster of Paris could not be used to draw water from the plastic clay being formed in the mold due to the solid metallic coating. Thus, notwithstanding the fact that the art has long been aware of the problems of abrasion, erosion and scratching attendant to plaster of Paris molds, a satisfactory method of solving these problems without destroying the beneficial properties of the plaster of Paris has not been found prior to the present invention.

An object of the present invention therefore is to provide a solution to the problem of abrasion, erosion and scratching of plaster of Paris molds without destroying the beneficial water withdrawing capacity of the mold. Thus, according to the present invention, a mold having a continuous surface of fused metal oxide, particularly alumina, with a porosity of about 10 percent is provided. This mold can be accurately formed and has a porous surface, which surface is resistant to abrasion, erosion and scratching. Such a mold having a plaster of Paris mold body shows the surprising and unexpected result that the flame sprayed coating does not restrict or inhibit the very strong water withdrawal properties of the plaster of Paris.

It has been found that it is not readily possible to apply refractory materials by flame spraying directly to the plaster of Paris and furthermore, flame sprayed coatings usually have a rough free surface which would require difficult and expensive grinding to provide the necessary accurate and smooth surface for the mold. By suing the transfer coating technique outlined above, the rough surface of the coating opposite to the side deposited on the former, is used to provide strong adhesion with the plaster of Paris mold body, whereas the side of the coating that is deposited directly on the former has a smoothness that substantially duplicates the smooth surface of the former on which the coating is first applied.

Suitable materials for the former include most metals, porcelain and other high temperature stabilized ceramic materials. Low adhesion between the coating and the former results when the surface of the former is given a very fine abrasive blasting treatment before the coating is sprayed thereon, for example, the surface of the former may be blasted with a 220 mesh fused alumina abrasive. A release coating such as a silicone resin or polytetrafluoroethylene dispersion may then be applied by an aerosol to the blasted surface.

After the flame sprayed coating has been deposited on the former, the mold body is then cast on the free surface of the coating, the casting material forming the body, penetrating the interstices of the rough surface to provide a strong adhesion between the coating and the cast mold body. When the former is removed, the coating is retained on the cast mold body and remains an integral part thereof, to provide a mold with an exposed surface accurately reproducing the surface of the original former. The body of the mold may be cast from plaster of Paris or castable refractory cements.

Molds formed from plaster of Paris may be used in slip casting, in which ceramic bodies are formed by placing a relatively thin cream with a high water content in the mold. The mold, being porous, absorbs the water causing a layer of high solid content material to build-up on the walls. Excess slip is poured away, and the mold with its formed layer is placed in a slow drying oven. As the cast material dries, it shrinks slightly and releases itself from the mold walls and can easily be removed from the mold for firing.

The thickness of the refractory coatings sprayed on the former may be as great as desired, but the preferred range is between 0.002 inches and 0.005 inches. A preferred embodiment of this invention comprises a thickness of about 0.004 inches.

An example of the invention related to pottery bodies such as plates will now be described with reference to the accompanying drawings, in which:

DESCRIPTION OF THE PREFERRED EMBODIMENT

Figure 1:
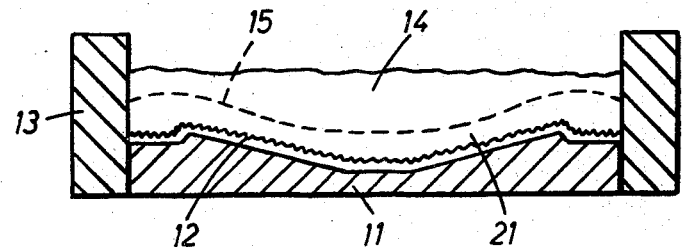
FIG. 1 is a diagrammatic cross-section through an arrangement for forming a mold body with a flame sprayed porous coating on one side.

As illustrated in FIG. 1, a smooth-surface steel master form 11 that has been grit blasted and coated with a release agent, has a refractory aluminum oxide coating 12 0.004 inches thick flame sprayed on its smooth surface, making use of the flame spraying system shown in U. S. Pat. No. 2,707,691. The coating 12 has about 10 percent open and interconnected pores. The master form 11 is surrounded by a band or steel ring 13 to support the sides of a fluid material poured on top of the coating 12. The fluid material is plaster of Paris having the consistency of thin cream. The fluid material flows onto the rough side of the flame sprayed coating opposite to the smooth side deposited on the form and the fluid material is supported by the band or ring walls 13 until the plaster of Paris hardens and is set. The upper surface of the plaster of Paris filling 14 sets flat, and is subsequently machined to the dashed line contour 15 to provide a porous mold body 21 which is approximately 3 inches thick.

Figure 2:
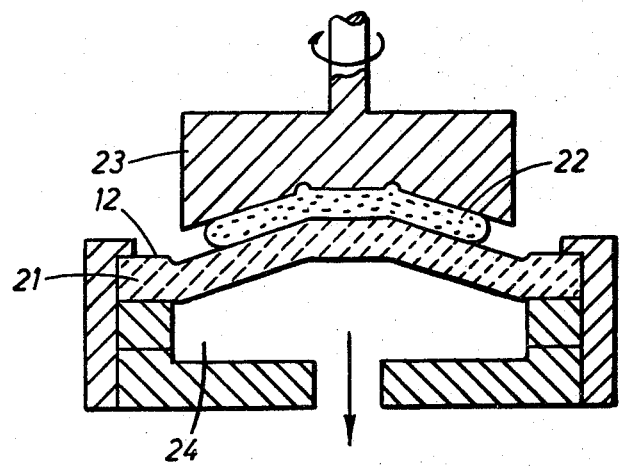
FIG. 2 is a diagrammatic cross-section through an arrangement for forming a plate using the mold illustrated in FIG. 1.

The machined mold 21 is removed from the master form 11 and is then ready for use. For such purpose mold 21 is mounted in the slip casting arrangement of FIG. 2, with the refractory coating 12 uppermost.

The material 22 to be cast or formed into the shape of a plate, as here shown, is worked into a wet plastic condition and a measured quantity is placed on top of the smooth surface of the coating 12 and shaped on its upper side by a rotating shaper 23. The liquid from the material 22 is withdrawn through the porous surface 12 into the plaster of Paris mold body to be elminiated from the material 22, which may then be removed from the mold. Due to the hard wear resistant characteristic of coating 12, the conventional slip casting operation may be repeated innumerable times without undue wear showing on the mold surface.

The mold functions to permit water to pass from the material 22 through the interconnecting pores of coating 12 and into the plaster of Paris. The latter material has a very large capacity to extract water from a slip, that may be assisted by vacuum equipment if the process is to be speeded up. The mold constructed as above described thus incorporates the basic plaster of Paris mold body in a structure having a smooth slip receiving surface that produces the desired finish on the slip cast object and yet the surface of the mold is in no way affected by repeated recycling of the slip casting step so that precision slip cast objects can be repeatedly made in the same mold.

What is claimed is:

1. A method of forming a composite porous slip casting mold structure having a smooth, hard and wear resistant slip receiving surface and a porous water absorbing body to effect removal of the liquid phase of the slip to produce a finished slip casting comprising spraying molten particles of a refractory metal oxide material against the smooth surface of a metal or ceramic form conditioned to permit the form to be later separated from the flame sprayed material and having the shape of the desired casting, freezing the particles in situ on the form to produce a hard porous layer thereon, said hard layer having a smooth surface on one side that is formed by reason of the molten particles solidifying while in contact with the smooth surface of the form and the exposed surface of the solidified layer on the form being relatively rougher, surrounding the rougher surface of the layer on the form with an activated mass of plaster of Paris material having the consistency of thin cream, allowing the plaster of Paris material to set and harden to bond it to the rougher surface of the layer, and then removing the composite structure including the layer of metal oxide and hardened plaster of Paris from the form whereby to provide a porous slip cast mold structure adapted to rapidly absorb water from a slip placed in it.

2. A method as in claim 1 wherein the metal oxide is an alumina material and is sprayed to have a porosity of about 10 percent.

3. A method as in claim 1 wherein the hardned plaster of Paris mold is shaped subsequent to setting.

4. A method as in claim 1 wherein the metal oxide layer is sprayed to be approximately in the range of 0.002 to 0.005 inches thick.

5. A composite slip cast mold structure having a smooth porous surface in the mold to receive the slip and a porous body to absorb the water from the slip comprising a flame sprayed porous refractory metal oxide layer that is initially formed to shape by being sprayed as molten droplets and frozen in situ on a metal or ceramic form conditioned to permit the form to be later separated from the flame sprayed material and having the shape of the slip casting to be produced and a mass of plaster of Paris material integrally bonded to said solidified layer; said metal oxide layer having a smooth exposed slip receiving surface and a rougher interface surface that is bonded to said plaster of Paris material; said smooth surface having approximately the same degree of finish as the surface of the mold onto which the molten metal oxide was sprayed; said rougher interface surface being the exposed surface of the layer resulting from flame spraying and freezing the metal oxide in situ on a mold; and said metal oxide layer being hard, wear resistant and porous.

6. A mold structure as in claim 5 wherein the slip receiving layer is alumina.

7. a mold structure as in claim 5 wherein the slip receiving layer is approximately 0.002 to 0.005 inches thick.

8. A mold structure as in claim 6 wherein the alumina layer is about 10 percent open and interconnected pores.

9. A mold structure as in claim 8 wherein the porous alumina layer is approximately 0.004 inches thick.

* * * * *